United States Patent Office 2,879,845
Patented Mar. 31, 1959

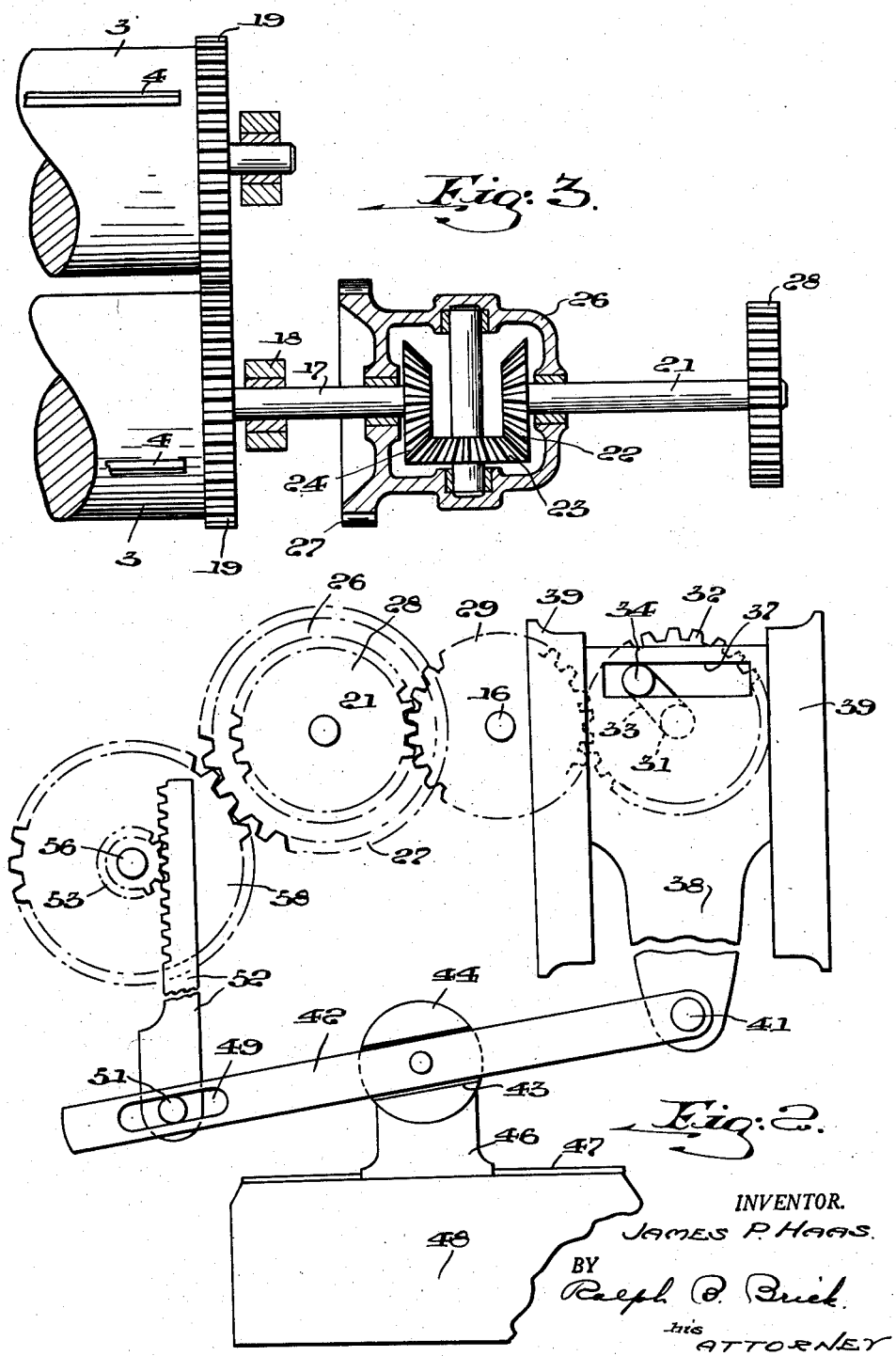

2,879,845
ROTARY SHEARS

James P. Haas, Baltimore, Md., assignor to Koppers Company, Inc., a corporation of Delaware Application January 18, 1956, Serial No. 559,978

7 Claims. (Cl. 164—66)

This invention relates to rotary shears and more particularly to rotary flying shears having means for adjusting the length of material cut thereby.

In cutting sheets of longitudinally moving material, as is required in various industries, rotary flying cutting devices or shears frequently are used to accomplish such an operation, the rotary shears cutting the material into a selected length as it is fed thereto. In many instances it is further desirable that the lengths of material to be cut by the shears be varied, and that the shears be readily adjustable for such an operation. For example, in the manufacture of corrugated board, sheets of board material are fed continuously by a special machine called a "corrugator," the board traveling at speeds of 700 ft. per minute or more. Since it is desirable to cut the outgoing strips of board fed from the corrugator into lengths varying, for example, from 30 inches to 180 inches, cut-off knives are required which are capable of cutting the board while it is in motion, it being further desirable that these cut-off knives are adjustable to cut the boards into selected and varying lengths.

Rotary shears which have been used for this purpose have consisted of two drums or cutter-carrier means rotatable about parallel, spaced axes, each drum carrying a cutter so arranged that the two cutters meet at each revolution of the drums to sever the board. To cut boards of different lengths, it is necessary to increase or decrease the time that elapses between consecutive meetings of the blades. Since the blades should travel at substantially board speed when shearing the board, it has also been essential to vary the angular velocity of the cutter-carrier means during each revolution. By controlling the average speed of the rolls and the variations of angular speed of the rolls during each revolution, it has been possible to obtain boards of any desired length.

The accelerating and decelerating mechanisms which have been used in the past to help control the variations of the angular speed of the rolls during each revolution to bring the cutter means to board speed for shearing have created large reversing torques. These large torques have resulted in fast wear on the variable speed drive used to power the rotary shear and have further resulted in errors in board length. To reduce these torques balancing means have been used which have included one flywheel. However, these past balancing means have not performed efficiently at high operating speed or when a wide range of material lengths is to be cut.

The present invention provides rotary shears which includes a balanced accelerating and decelerating mechanism that eliminates the aforementioned disadvantages, practically eliminating the reversing torques transmitted to the variable speed drive by providing additional flywheel balancing mechanism. In addition, the present invention provides means for regulating in unison the board length to be cut-off during operation of the rotary shears and the corresponding balancing torques.

Various other features of the present invention will become obvious upon reading the disclosure set forth hereinafter.

More particularly, the present invention provides rotary shears for transversely cutting longitudinally moving material comprising rotatably-mounted cutter-carrier means having cutter means fixed thereto, drive means for the cutter-carrier means, the drive means having an adjustable constant angular velocity, cutter-carrier speed varying means interposed between the cutter-carrier means and the drive means to bring the speed of the cutter-carrier means at the instant of cut to substantially the speed of the material to be cut thereby, counterbalance-means including two flywheels having different cyclic motions for balancing torques created by the cutter-carrier means and the cutter-carrier speed varying means as the angular speed of the cutter-carrier means is varied, and regulating means for the cutter-carrier speed varying means and counterbalance-means, the regulating means being operably adjustable during operation of the shear to regulate the amount of variation induced by the cutter-carrier speed varying means and also the corresponding balancing torques so that the rotary shears can be driven through one single shaft submitted to a substantially constant and minimum torque.

It is to be understood that various changes can be made by one skilled in the art, in the arrangement, form, and construction of the apparatus disclosed herein without departing from the scope or spirit of the present invention.

Referring to the drawings which illustrate one advantageous embodiment of the invention, the reference numerals of which indicate like parts:

Figure 2 is a schematic elevational view of the speed varying means, used for driving the ring gear of the differential unit as disclosed in Figures 1 and 3;

Figure 3 is a schematic broken elevational view of the differential unit disclosed broadly in Figure 1.

Figure 1:
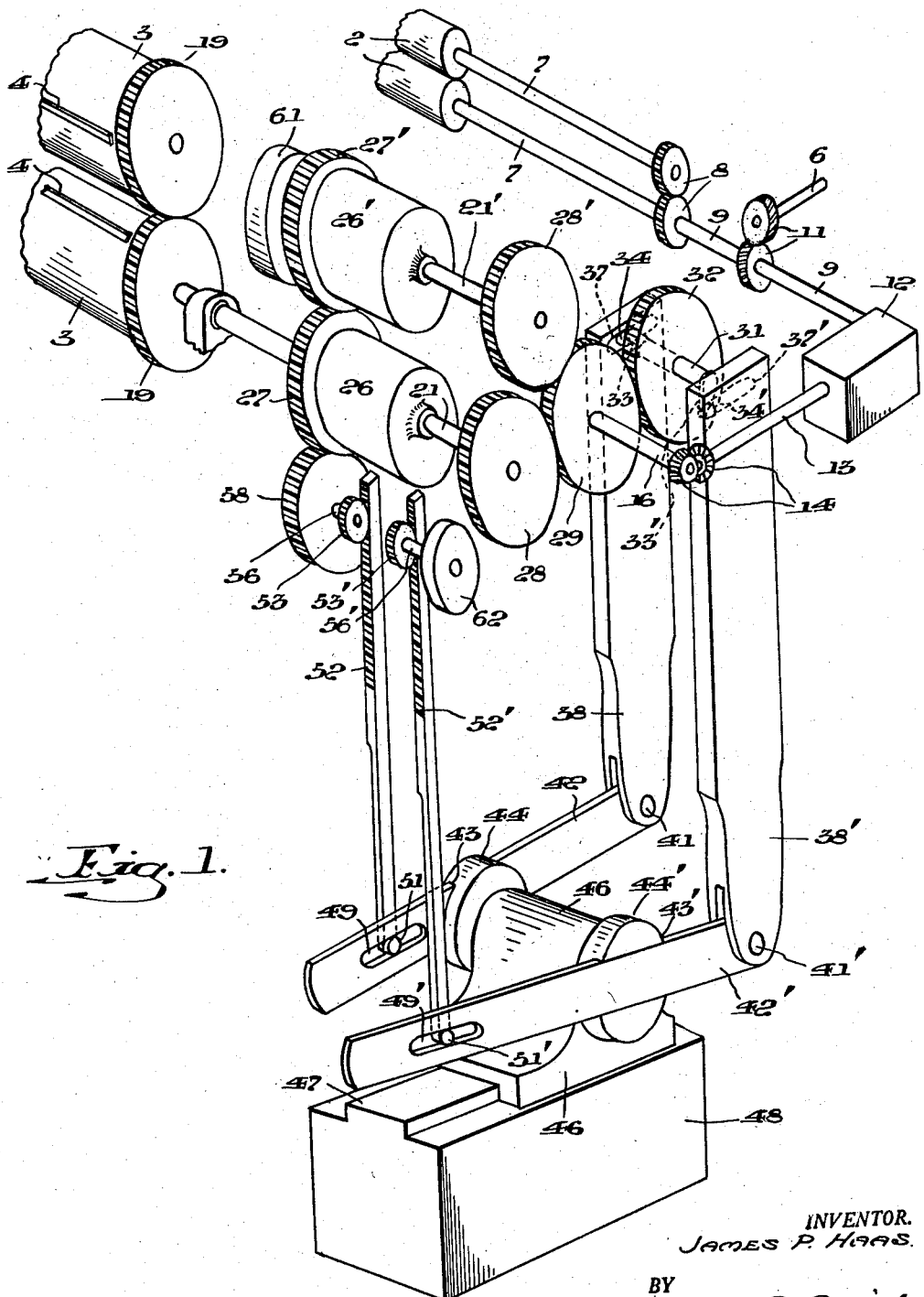
Figure 1 is a schematic isometric view disclosing a portion of a rotary shears including the counterbalance-means used for balancing reversing torques created by the cutter and cutter-carrier means and the speed varying means.

Referring to Figure 1 of the drawings, feed rolls 2 are disclosed for feeding the stock to be cut to the cutter-carriers 3, each cutter-carrier being provided with a cutter means in the form of cutter blade 4. A line shaft 6, which can be connected to a material fabricating machine (not shown), drives the feed rolls in known manner by means of spindles 7, pinions 8, and a shaft 9 connected to one of the pinions, this shaft being driven by line shaft 6 through gearing 11. The shaft 9 is also connected by means of an adjustable ratio transmission 12, of any suitable and well known type, to a shaft 13 which in turn is connected by bevel gearing 14 to the drive shaft 16, which drive shaft is connected to drive the cutter-carriers 3 through speed varying means including a differential gear mechanism and linkage assembly described hereinafter, and connected also to counterbalance-means including a second differential gear mechanism and a second linkage assembly.

Referring to Figure 3 of the drawings, the differential gear mechanism used in varying the cutter-carrier speed to accelerate and decelerate the same includes three rotatable elements, the first of these elements being in the form of an output shaft 17 rotatably-mounted in the bearing block member 18 and keyed to one of the pair of meshing spur gears 19 fixed to the cutter-carriers 3. The second of these rotatable elements is in the form of a differential input shaft 21 which is connected to output shaft 17 through a bevel gear arrangement including meshing gears 22, 23, 24 disposed in the differential housing 26. The housing 26, in turn, is provided with a ring gear 27 integral therewith, ring gear 27 and housing 26 serving as the third rotatable element of the differential gearing mechanism.

Referring to Figures 1 and 3 of the drawings, it can be seen that input shaft 21 is driven through gear 28 attached thereto, gear 28 being driven in turn by gear 29 keyed to drive shaft 16. As a result of this particular gearing arrangement, gear 28 and input shaft 21 connected thereto are driven at constant speed. When the ring gear 27 does not rotate, the cutter-carriers 3 are also driven at a constant speed through the differential. Accordingly, when an angular velocity is imparted to the ring gear 27, the ring gear will add to or subtract from the constant angular velocity imparted through output shaft 17 to the cutter-carriers 3 by the gear 28. If ring gear 27 is caused to rotate in the same direction as gear 28, the speed of the output shaft 17 will be reduced and, if ring gear 27 is caused to rotate in the opposite direction as gear 28, the speed of the output shaft will be increased. In this manner, the cutter-carriers 3 are accelerated and decelerated.

Referring to Figure 2 of the drawings, the linkage mechanism used to impart rotation to ring gear 27 is disclosed, this mechanism serving to add to or subtract from the cutter-carrier means angular velocity as is required for the particular length of material to be severed. More particularly, a crank roller shaft 31 is disclosed as being driven by a spur gear 32 fixed thereto, spur gear 32 meshing in turn with main gear 29 used to drive gear 28 as aforedescribed, spur gear 32 being of the same pitch diameter as gear 28. Attached to one end of crank roller shaft 31 is crank arm 33, this crank arm, in turn, carrying the crank roller 34, rotatably mounted at the free end of the crank arm. The crank roller 34 engages a slot 37 positioned at one end of a yoke member 38. The member 38 is mounted for slideable movement in the spaced apart vertical guide members 39 (not shown in Fig. 1) and has attached to the end opposite slot 37, by means of a pin 41, one end of a rocking arm 42. Rocking arm 42 is pivotally supported intermediate its extremities in slot 43, the slot 43 extending diametrically across the pivotal fulcrum member 44. Fulcrum member 44 is pivotally mounted on block 46, the lower portion of the block 46 cooperating with guideway 47 of base 48 to permit block 46 to be slideably moved relative the base 48. The extremity of rocking arm 42 opposite that extremity attached to the yoke 38 is provided with a slot 49 which extends along the longitudinal axis of the rocking arm. Engaging this slot is a roller 51 which is carried at one end of the rack 52, the teeth portion of the rack 52 at the other end thereof engaging with a pinion 53 carried by the shaft 56. Also fixed to shaft 56 is a spur gear 58, this gear 58 engaging with the third rotatable element of the differential mechanism, namely the ring gear 27 integral with the differential housing 26. Thus, any rotary motion imparted to shaft 56 will, in turn, be imparted to the ring gear 27 of the differential mechanism to vary the speed of the output shaft 17. From the above description, it will be obvious that motion of the yoke member 38 will be transmitted to the shaft 56 through the rocking arm 42 and the rack and pinion arrangement 52, 53. It is to be noted that the amplitude of the rack motion is determined by the position of the pivot block 46 slideably mounted relative the base 48. Accordingly, this slideable pivot block provides a regulating means cooperative with the linkage mechanism aforedescribed, which can be moved during the actual operation of the shear to control the amplitude of rack motion and thus regulate the amount of variation induced.

In the operation of the abovedescribed mechanism, when the input shaft 21 is driven at constant speed through the gear 28, all the elements of the mechanism will occupy the same respective positions after one complete revolution of the gear 28. As gear 28 rotates one revolution at constant speed, the output shaft 17 also rotates one revolution but is accelerated and decelerated or vice versa by the action of the linkage that oscillates the ring gear 27 as abovedescribed. To insure that the cutting takes place between the cutter blades 4 when the angular velocity of the rolls 3 is maximum or minimum, which corresponds to zero acceleration, the blades on the rolls are indexed to meet when the rocking arm 42 is perpendicular to both the longitudinal axis of the rack 52 and the longitudinal axis of the yoke 38.

In the system described above, the acceleration and deceleration of the rolls causes reversing torques of such magnitude that the life of the drive is impaired although the energy balance is very small. To neutralize these abovementioned torques so that the driving variable speed unit will be submitted to greatly reduced loads and its life extended, an internal counterbalance-means is provided which serves to separately balance reversing torques induced on gears 28 and 32. More particularly, this counterbalance-means comprises a first counterbalance system including a second differential unit having a housing 26' with a ring gear 27' fixed thereto and engageable with the ring gear 27 of the first differential housing, this second differential unit being connected to a spur gear 28' fixed to input shaft 21', the spur gear 28' being engaged by gear 29 which engages gear 28 connected to the first differential unit. Although not shown, it is to be understood that the input shaft 21' of the second differential unit is connected to an output shaft thereof by bevel gears in a manner like that shown for the first differential unit. It is to be noted that ring gear 27' of the second differential has the same pitch diameter as ring gear 27 and that gear 28' also has the same pitch diameter as gear 28 connected to the first differential, being driven at the same speed and in the same direction as gear 28. Mounted on the output shaft of the second differential unit is a flywheel 61. This flywheel has a mass polar moment of inertia equal to the mass moment of inertia of the rotating system comprising the cutter-carrier blades 4 and rolls 3 and the synchronizing gears 19 thereof.

From the above description, it can be seen that as ring gear 27 of the first differential is driven in one direction, the ring gear 27' of the second differential is driven in the opposite direction. Thus, as the rolls are accelerated, the flywheel 61 is decelerated in equal amount so that torques on gear 28 and 28' are equal and opposite and the torque required to drive gear 28 and 28' is theoretically zero.

The system is not completely balanced, however, since the force required to move rack 52 is twice as large as it would be if only one differential ring gear was driven. This force on rack 52 results in a varying moment on the crank roller shaft 31. As can be seen in Figure 1 of the drawings, the counterbalance-means includes a second linkage mechanism. This second linkage mechanism is connected to the other end of the crank shaft 31 and includes a crank arm 33' having a roller member 34' engageable in a slot 37' at one end of a yoke member 38', the yoke 38' having its other end attached by means of a pin 41' to a rocker arm 42'. The rocker arm 42', in turn, has its other end provided with a slot 49', in which rides a roller 51' mounted on rack 52', the other end of which rack is engageable with a pinion 53' mounted on a shaft 56'. It is to be noted that the rocker arm 42' is carried by a fulcrum member 44' in slot 43' of such fulcrum member. Fulcrum member 44' is pivotally mounted on the same block 46 which supports the fulcrum member 44 for the first rocking arm 42, the fulcrum member 44' carrying the rocking arm 42' in such a manner that the second accelerating and decelerating linkage is alongside and 90° out of phase with the first linkage. A second flywheel 62 is mounted on the shaft 56' supporting the pinion 53'. This second flywheel has a mass polar moment of inertia of such magnitude that the moment or torque imparted to the crank roller shaft 31 through the first linkage mechanism is balanced. The torques created to accelerate and decelerate the rolls and flywheels balance one another and the torque required to drive the system fluctuates very little and is of comparatively low magnitude. In this connection, it is to be noted that when the pivot block 46 is moved to regulate the amount of variation induced by the cutter-carrier speed varying means, it also regulates the balancing means.

With the cut-off knife mechanism above described, it is possible to shear strip material by means of rotary shears internally well balanced and which can be readily regulatable regardless of the fact that the shears might be in operation while still maintaining the balance for any desired length.

The invention claimed is:

1. Rotary shears for transversely cutting longitudinally moving material comprising, rotatably-mounted cutter-carrier means having cutter means fixed thereto, drive means for said cutter-carrier means, said drive means having an adjustable constant angular velocity, cutter-carrier speed varying means interposed between said cutter-carrier means and said drive means to bring the speed of said cutter means at the instant of cut substantially to the speed of material to be cut thereby, counterbalance-means including two flywheels having different cyclic motions for balancing torques created by said cutter-carrier means and said cutter-carrier speed varying means as the angular speed of said cutter-carrier means is varied, and regulating means for said cutter-carrier speed varying means and counterbalance-means, said regulating means being operably adjustable during operation of said shear to regulate the amount of variation induced by said cutter-carrier speed varying means and also the corresponding balancing torques so that the rotary shears can be driven through one single shaft submitted to a substantially constant and minimum torque.

2. A rotary shear for transversely cutting longitudinally moving material comprising, rotatably-mounted cutter-carrier means having cutter means fixed thereto, drive means for said cutter-carrier means, said drive means having an adjustable constant angular velocity, cutter-carrier speed varying means interposed between said cutter-carrier means and said drive means to bring the speed of said cutter means at the instant of cut substantially to the speed of material to be cut thereby, said cutter-carrier speed varying means including a differential mechanism having three rotatable elements, one of said elements being connected to said cutter-carrier means, the second of said elements being connected to said drive means, and linkage mechanism connecting said drive means to the third of said elements to bring the speed of said cutter means substantially to the speed of material to be cut, and regulating means cooperating with said linkage mechanism, said regulating means being operable during operation of said shear to regulate the amount of variation induced by said cutter-carrier speed varying means.

3. A rotary shear for transversely cutting longitudinally moving material comprising, rotatably-mounted cutter-carrier means having cutter means fixed thereto, drive means for said cutter-carrier means, said drive means having an adjustable constant angular velocity, cutter-carrier speed varying means interposed between said cutter-carrier means and said drive means to bring the speed of said cutter means at the instant of cut substantially to the speed of material to be cut thereby, said cutter-carrier speed varying means including a differential gearing having three rotatable elements, one of said elements being connected to said cutter-carrier means, the second of said elements being connected to said drive means, and linkage mechanism including a rocker arm assembly connecting said drive means to the third of said elements to bring the speed of said cutter means substantially to the speed of material to be cut, and regulating means including a movably mounted fulcrum support member for said rocker arm assembly, said fulcrum support member being movable during operation of said shear to regulate the amount of variation induced by said cutter-carrier speed varying means.

4. A rotary shear for transversely cutting longitudinally moving material comprising, rotatably-mounted cutter-carrier means having cutter means fixed thereto, drive means for said cutter-carrier means, said drive means having an adjustable constant angular velocity, cutter-carrier speed varying means interposed between said cutter-carrier means and said drive means to bring the speed of said cutter means at the instant of cut substantially to the speed of material to be cut thereby, said cutter-carrier speed varying means including a first differential gearing having three rotatable elements, the first of said elements being connected to said cutter-carrier means, the second of said elements being connected to said drive means, and a first linkage mechanism including a rocker arm assembly connecting said drive means to the third of said elements to bring the speed of said cutter means substantially to the speed of material to be cut, a counterbalance-means comprising a first counterbalance element including a second differential gearing supporting a first flywheel and cooperating with said first differential gearing, and a second counterbalance element including a second linkage mechanism driving a second flywheel and cooperating with said first linkage mechanism and 90° out of phase therewith, and regulating means including a movably mounted fulcrum support member for said first and second linkage mechanisms, said fulcrum support member being movable during operation of said shear to regulate the amount of variation induced by said cutter-carrier speed varying means and also the corresponding balancing torques.

5. In a machine having a rotor mechanism with drive means for said rotor mechanism and rotor mechanism speed varying means interposed between said rotor mechanism and said drive means to vary selectively the speed of the rotor at a portion of the rotor cycle, a counterbalance-means cooperating with said rotor mechanism and said rotor mechanism speed varying means including two flywheels having different cyclic motions for balancing torques created by said rotor mechanism and said rotor speed varying means as the angular speed of said rotor means is varied, and regulating means for said rotor speed varying means and counterbalance-means, said regulating means being operably adjustable during operation of said rotor to regulate the amount of variation induced by said rotor speed varying means and also the corresponding balancing torque so that the rotor can be driven through one single shaft submitted to a substantially constant and minimum torque.

6. A machine having a rotor mechanism with drive means for said rotor mechanism and a rotor speed varying means interposed between said rotor mechanism and said drive means to vary the speed of the rotor at a portion of the rotor cycle, said speed varying means including a first differential gearing having three rotatable elements, the first of said elements being connected to said rotor mechanism, the second of said elements being connected to said drive means, and a first linkage mechanism including a rocker arm assembly connecting said drive means to the third of said elements to vary selectively the speed of the rotor at a portion of the rotor cycle, a counterbalance-means comprising a first counterbalance element including a second differential gearing supporting a first flywheel and cooperating with said first differential gearing, and a second counterbalance element including a second linkage mechanism driving a second flywheel and cooperating with said first linkage mechanism and 90° out of phase therewith, and regulating means including a movably mounted fulcrum support for said first and second linkage mechanism, said fulcrum support member being movable during operation of said rotor to regulate the amount of variation induced by said rotor speed varying means and also the corresponding balancing torques.

7. In a machine for imparting reciprocating motion to a driven member including a drive means and a first linkage mechanism connecting said drive means to said driven member, a balancing apparatus comprising a second linkage mechanism cooperating with said first linkage mechanism and 90° out of phase therewith, said second linkage mechanism being connected to a flywheel to counterbalance the torque created in imparting such reciprocating motion to said driven member.

References Cited in the file of this patent

UNITED STATES PATENTS

| | | |
|---|---|---|
| 512,896 | Penuela | Jan. 16, 1894 |
| 2,144,307 | Hallden | Jan. 17, 1939 |
| 2,180,203 | Hallden | Nov. 14, 1939 |